UNITED STATES PATENT OFFICE.

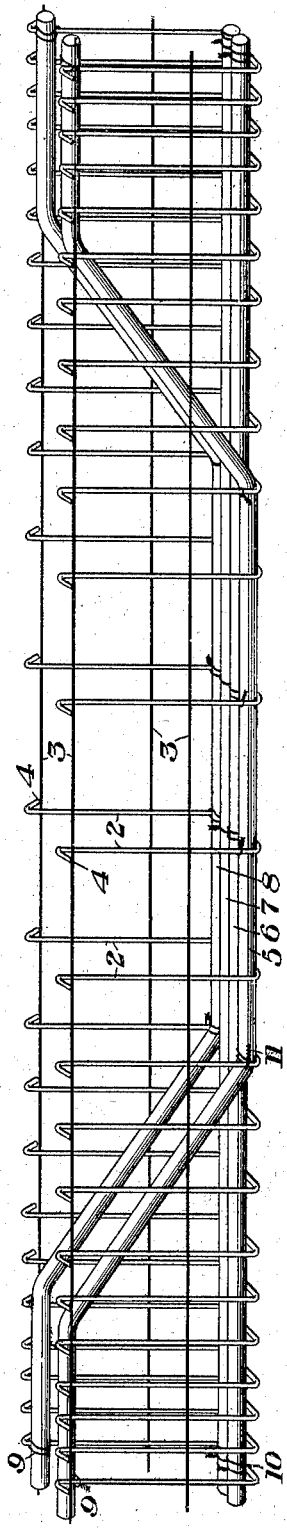

ELIOTT E. NICKSON, OF PHILADELPHIA, PENNSYLVANIA, ASSIGNOR TO THE NATIONAL FIRE PROOFING COMPANY, OF PITTSBURG, PENNSYLVANIA, A CORPORATION OF PENNSYLVANIA.

REINFORCING STRUCTURE FOR CONCRETE.

965,729.          Specification of Letters Patent.     Patented July 26, 1910.

Application filed November 7, 1908. Serial No. 461,497.

*To all whom it may concern:*

Be it known that I, ELIOTT E. NICKSON, of Philadelphia, in the county of Philadelphia and State of Pennsylvania, have invented a new and useful Improvement in Reinforcing Structures for Concrete, of which the following is a full, clear, and exact description, reference being had to the accompanying drawings, forming part of this specification, in which—

Figure 1 is a perspective view of a reinforcing structure constructed in accordance with my invention; and Fig. 2 is a cross section of the reinforce in position; and Fig. 3 is a detail view of the stirrup member.

My invention relates to the reinforcing of concrete beams, and is designed to provide a guiding and supporting cage in which the tension reinforces are held. It is also designed to form this cage from the U-shaped stirrup, in combination with longitudinal wires, giving a U-shaped cage open at the top, in which the longitudinal tension members are laid and to which they may or may not be secured. Heretofore the longitudinal tension reinforces have been liable to be forced out of place, so that they are not in the desired position in the final concrete beam. The same has also been true of the stirrups although these stirrups have been secured to each other in different ways in the prior art.

In carrying out my invention, I form a long U-shaped cage open at the top which is preferably made of welded wire cloth. This wire cloth may be cut off into lengths and then bent up into U-shape to form the cage. In Fig. 1, I show the cage as consisting of U or stirrup shaped members 2, and the longitudinal wires 3 welded thereto. The upper ends of the stirrups are preferably bent backwardly, as shown at 4, these rearward projections resting on the wooden centering and serving to center the reinforce vertically and horizontally and also lift its lower portion above the bottom of the centering, so that the reinforce is completely surrounded by the concrete. The longitudinal reinforcing members, of which I have shown four, 5, 6, 7 and 8, are laid in the bottom of the cage and through the center part of the beam. They extend along the bottom parallel with each other in the same horizontal plane. At the end of the beam, the reinforces 5 and 8 are bent upwardly and extend along the upper part of the beam in its end portions which are subjected to shear. The stirrups are also spaced closer together near the ends of the beams and wider apart near the center of the beam where the shearing action is lessened.

I have shown the four longitudinal tension reinforces as secured to the cage by wire loops shown at 9, 10 and 11. These longitudinal reinforces may, however, be laid in the cage which will hold them in proper position, though I prefer to wire them to the cage to hold them more securely in the desired location.

The advantages of my invention result from the use of a U-shaped cage open at the top into which the longitudinal reinforcing members are slid to hold them in proper position in the centering mold for the beam. The tension members are thus held in place and not liable to get out of position, while at the same time, the stirrup shaped shear members are held in correct relation to each other, being a part of the cage, which, in this case, is of welded wire cloth. The backward projections of the upper ends of the stirrups center the entire apparatus in the mold, both sidewise and vertically, and lift its lower portion above the bottom of the mold. The cage may be easily and cheaply made and is found to be efficient in its action. The longitudinal reinforces may be quickly and easily wired or otherwise secured to the cage.

The wires of the cage may be secured together by loops or in any desirable way other than welding. The shape of the cage may be varied as well as the longitudinal reinforces, and other variations may be made without departing from my invention.

I claim:

1. A metal reinforce for concrete, comprising a cage open at the top and made up of a plurality of U-shaped members arranged in spaced longitudinal alinement, and longitudinal members rigidly connected, as by welding, to the vertical arms of the U-shaped members and tying them into a unitary cage-like structure which can be handled as one piece and which is adapted to receive therein a plurality of reinforcing members; substantially as described.

2. A metal reinforce for concrete, comprising a cage open at the top, and made up of a plurality of U-shaped members placed in spaced longitudinal alinement, and longitudinal members rigidly connected, as by welding, to the vertical arms of the U-shaped members at different vertical points and tying them into a unitary cage-like structure which can be handled as one piece, and longitudinal reinforcing members lying within the structure and supported upon the bottom thereof; substantially as described.

In testimony whereof, I have hereunto set my hand.

ELIOTT E. NICKSON.

Witnesses:
GEO. H. PARMELEE,
H. M. CORWIN.